United States Patent [19]
Rozon

[11] Patent Number: 5,993,983
[45] Date of Patent: Nov. 30, 1999

[54] PORTABLE POWER SUPPLY USING HYBRID BATTERY TECHNOLOGY

[75] Inventor: Paul Rozon, Saint-Luc, Canada

[73] Assignee: Century Mfg. Co., St. Paul, Minn.

[21] Appl. No.: 08/818,119

[22] Filed: Mar. 14, 1997

[51] Int. Cl.[6] .......................... H01M 12/00; H01M 6/46; H01M 2/10; H01M 10/44
[52] U.S. Cl. ................ 429/9; 429/156; 429/187
[58] Field of Search ................... 429/9, 49, 96, 429/99, 156, 160, 158, 159, 187

[56] References Cited

U.S. PATENT DOCUMENTS

| | | | |
|---|---|---|---|
| 2,616,937 | 11/1952 | Kullgren . | |
| 3,165,689 | 1/1965 | Hughes . | |
| 3,607,403 | 9/1971 | Arrance | 136/5 |
| 3,883,368 | 5/1975 | Kordesch et al. | 136/86 A |
| 4,239,839 | 12/1980 | McDowall et al. | 429/154 |
| 4,447,504 | 5/1984 | Goebel | 429/9 |
| 4,770,954 | 9/1988 | Noordenbos | 429/9 |
| 4,883,728 | 11/1989 | Witehira | 429/160 |
| 5,002,840 | 3/1991 | Klebenow et al. | 429/9 |
| 5,047,300 | 9/1991 | Juergens | 429/94 |
| 5,108,848 | 4/1992 | Kramer | 429/9 |
| 5,194,799 | 3/1993 | Tomantschger . | |
| 5,223,351 | 6/1993 | Wruck | 429/9 |
| 5,340,662 | 8/1994 | McCarter | 429/9 |
| 5,352,966 | 10/1994 | Irons . | |
| 5,565,756 | 10/1996 | Urbish et al. . | |
| 5,589,292 | 12/1996 | Rozon | 429/170 |
| 5,614,331 | 3/1997 | Takeuchi et al. | 429/9 |

FOREIGN PATENT DOCUMENTS

| | | |
|---|---|---|
| 0 370 534 A2 | 5/1990 | European Pat. Off. . |
| 0 513 531 A1 | 11/1992 | European Pat. Off. . |
| 1 005 141 | 3/1957 | Germany . |
| 196 11 776 A1 | 9/1996 | Germany . |
| 3-210775 | 9/1991 | Japan . |
| 6-078465 | 3/1994 | Japan . |

OTHER PUBLICATIONS

Hawker Energy Products literature, entitled "The Genesls® Pure–Lead Thin Plate Advantage", 1 page, dated Sep. 1996.

Bolder Technologies Corporation literature, entitled "TMF", 2 pages, dated Jul. 1995.

Perez, Richard E. "The Complete Battery Book." TAB Books Inc., p. 4. (no month), 1985.

*Primary Examiner*—Maria Nuzzolillo
*Assistant Examiner*—Jonathan Crepeau
*Attorney, Agent, or Firm*—Merchant & Gould P.C.

[57] ABSTRACT

A personal portable power supply containing first and second different types of cells or batteries of cells. The capacity and discharge rate of the power supply is such that it is capable of starting automobile engines on several different occasions without needing to be electrically recharged. The capacity is also such that it can power personal devices for relatively long periods of time. The first cell or battery of cells is chosen to have a high discharge rate and high peak amperage or cold cranking amperage. The second type of cell or battery of cells is chosen to have a high energy density and a low cost. The electrical characteristics of each cell or battery of cells is chosen so that the second type of cell is able to recharge the first type of cell during periods of non-use.

23 Claims, 4 Drawing Sheets

PORTABLE POWER SUPPLY USING HYBRID BATTERY TECHNOLOGY

FIELD OF THE INVENTION

The present invention relates in general to portable power supplies for personal use such as boosting weak automobile batteries for starting purposes, and accessories such as portable radios, portable televisions, etc. The present invention relates in particular to a portable power supply which is both able to provide a large amount of current over a short period while still having a capacity to supply a smaller current over longer periods of time and/or recover from a large current drain.

BACKGROUND OF THE INVENTION

Personal portable power supplies are known which can be easily carried by a person to provide auxiliary power for the starting of automobiles with weak batteries or the playing of portable radios or televisions. Such a portable power supply is known from U.S. Pat. No. 5,589,292. This patent is hereby incorporated by reference. In this portable power supply, the operator is able to connect the portable power supply to the battery of an automobile engine to increase the starting power of the automobile battery. It is extremely useful on those occasions when a normally healthy battery is weakened due to extreme cold or prolonged discharge such as when the operator of the vehicle leaves electrical accessories such as headlights operating for prolonged periods of time without the engine running. The operator of the portable power supply can then hook the portable power supply to the battery of the vehicle to boost the power of the vehicle's battery and start the vehicle, thus allowing the vehicle's battery to recharge.

The operator of the portable power supply can also use the portable power supply to operate personal accessories such as radios for longer periods of time than the common dry cell batteries used in portable radios or when these portable devices are not near their normal source of power such as a car battery. The battery in these portable power supplies is preferably rechargeable so that they may be repetitively used.

When the portable power supply is used to start the engine of a motor vehicle, a large amount of current is needed over a very short time period. Traditional wet cell batteries, especially lead acid batteries are often used for this purpose. In particular sealed lead acid (SLA) batteries are the powered source of choice due to their ability to withstand rugged operating conditions such as over-charge and deep discharge, ease of maintenance, ability to withstand vibration and shock, and their capability of extended storage. Lead acid batteries which were developed in 1859, have conventionally been manufactured in 6 and 12 volt models. In SLA batteries, the amount of power depends on the battery chemistry and/or the number of battery plates. If a more powerful battery (higher discharge current) was desired to withstand extreme conditions, another battery with a larger ampere hour rating (capacity) would be used, for example a 20 amp per hour battery instead of a 15 ampere per hour battery. This would lead to a corresponding higher discharge current. This also leads to an increase in the size, weight and/or cost of the SLA battery.

Spirally wound batteries are known from U.S. Pat. No. 5,047,300 which is incorporated by reference. In this particular patent, thin film technology is used along with special terminal connectors to deliver a large amount of energy in a small time (power). If these thin metal film batteries are used in portable power supplies, they can provide a great deal of power to start an engine, however they discharge very rapidly due to low energy density (capacity) and the need to keep the size of portable device small. Thus, spiral wound batteries need to be recharged frequently. This can be inconvenient for the operator if he/she forgets to recharge the portable power supply between uses. Also the cost of thin metal film batteries is very expensive.

SUMMARY AND OBJECTS OF THE INVENTION

It is an object of the present invention to provide a personal portable power supply at a minimum size, weight and cost for starting an automobile engine, powering personal accessories and not requiring frequent recharging.

The present invention accomplishes these objectives by using a thin metal film battery in parallel with a standard or traditional wet cell or SLA battery. When the personal portable power supply is used to start an engine, the thin metal film (TMF) battery can supply large amounts of current for the several seconds required to start the engine. The high capacity of the standard wet cell or SLA battery can provide long-lasting current used in personal devices such as portable radios and televisions. Also by properly adjusting the electrical characteristics of each type of cell or battery, the standard wet cell can recharge the TMF cell during periods of non-use or low current discharge. In this way the portable power supply can be used on several occasions to start an engine without needing to be recharged after each use.

Once the desired peak amperage and capacity are determined, the different cells are chosen to minimize size, weight and cost.

The different cells are preferably chosen so that a first cell has a peak amperage which is higher than a peak amperage of a second cell. Also the discharge rate of the first cell is faster than the discharge rate of the second cell. The energy density of the second cell is larger than the energy density of the first cell. The nominal voltages of the cells or battery of cells are chosen to be substantially identical. Also the cells are chosen so that the voltage drop due to current discharge is larger in the first cell than in the second cell. In this way, after a use such as the starting of an automobile, the voltage of the first cell will be less than the voltage of the second cell and recharging of the first cell from the second cell takes place.

The TMF battery in one embodiment has an absolute peak amperage which is approximately equal to the SLA battery. However, the ratio of peak amperage to size and/or weight is ten times greater for the TMF battery in comparison with the SLA battery. Cost of the TMF battery is presently much higher than the cost of the SLA battery. By combining a TMF battery with a SLA battery, the desired peak amperage and capacity can be obtained at a minimum weight, size and cost.

Different applications will require a portable power supply with a different peak amperage and capacity. Therefore, the size of the first and second cells will be adapted for each application.

It is another object of the present invention to provide a personal power supply which performs well in a variety of situations and is economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
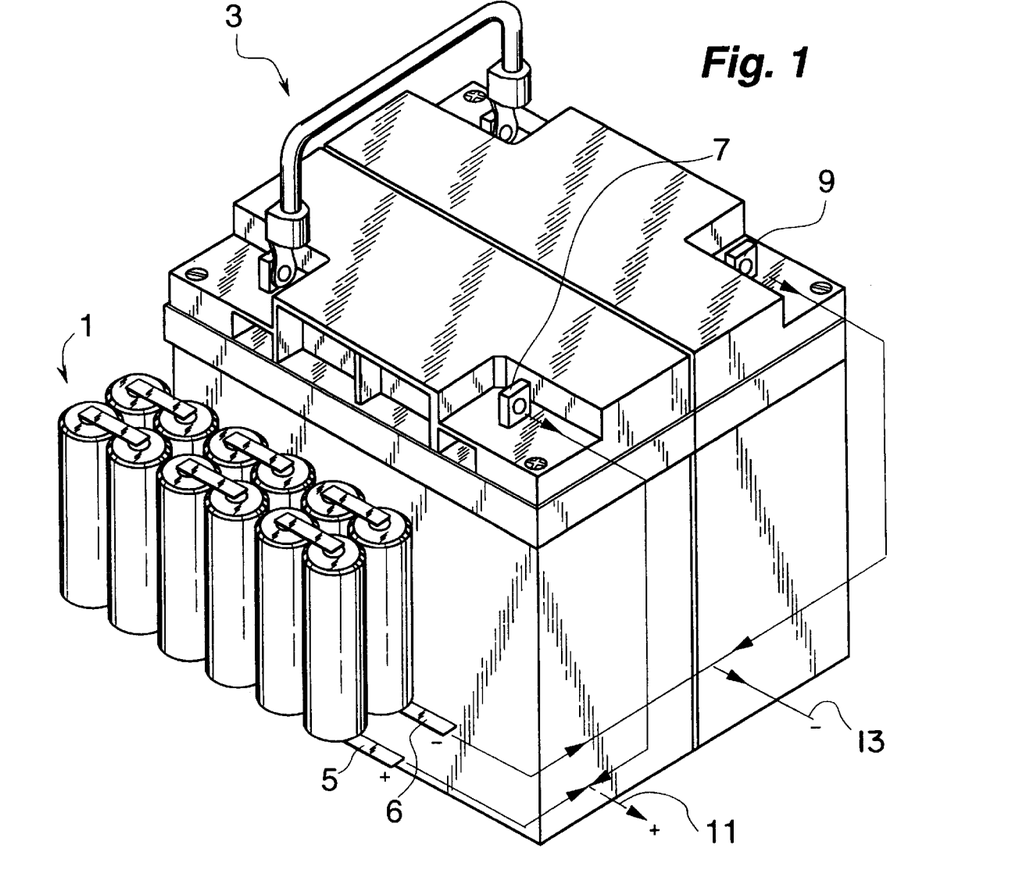
FIG. 1 is a view of the two different types of cells or batteries combined in parallel to form the power supply of the present invention.
Figure 2:
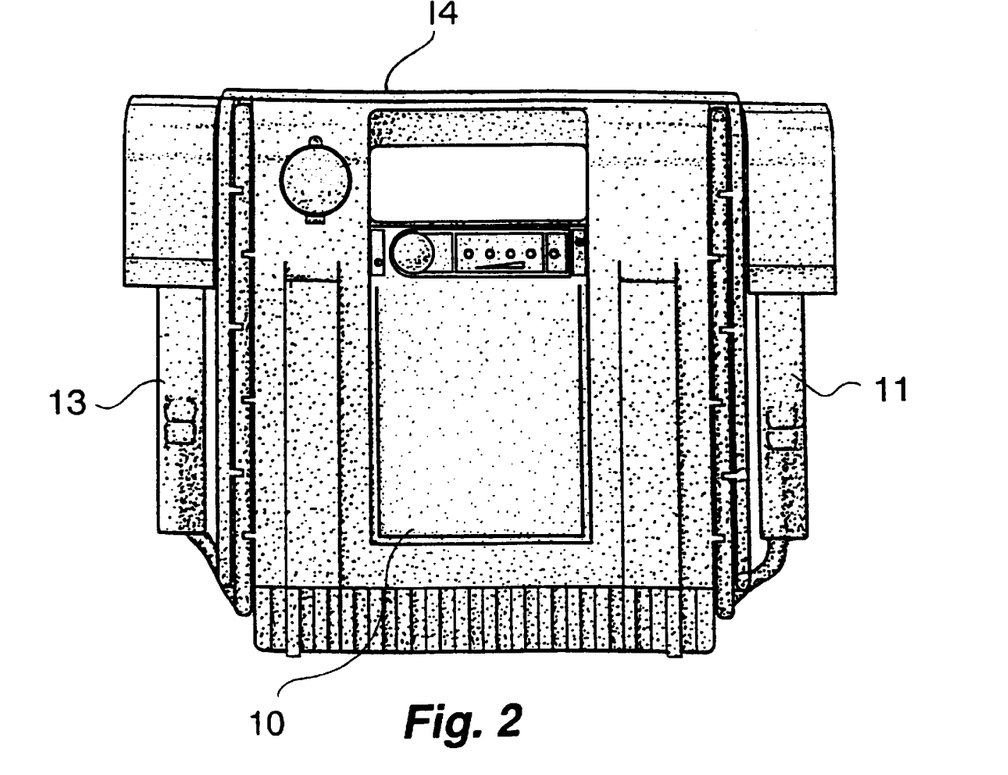
FIG. 2 is a front view of a housing of the power supply of the invention.

Referring to the drawings, the present invention includes two different types of cells 1, 3, connected in parallel to form a power supply. The first type of cell or battery of cells 1 includes positive and negative terminals 5, 6. The second type of cell or battery of cells 3 includes positive and negative terminals 7 and 9. The first and second cells 1, 3 are positioned in a housing 10 having positive and negative terminals 11, 13. Housing 10 has a handle 14 for grasping by the user. The positive terminal 11 of the housing 10 is connected to the positive terminals 5, 7 of the first and second cells or battery of cells, and the negative terminal 13 of the housing is connected to the negative terminals 6, 9 of the first and second cells or batteries of cells. The cells are electrochemical cells which produce electrical voltage and current through a chemical reaction. The cells are also preferably rechargeable, especially at least one of the cells, so that an electric voltage and current applied to the cells reverses the chemical reaction so that the chemical reaction can proceed at a later time to generate voltage and current.

The first type of cell or battery 1 has a peak amperage which is higher than the peak amperage of the second type of cell or battery 3, especially relative to size and weight. The peak amperage of the first cell 1 is of a magnitude sufficient for the starting of the engine of an automobile, by itself, or in combination with the peak amperage of the second cell. The capacity of the first cell, usually measured in amp hours, is of a magnitude to start an engine at least once and preferably several times. In order to start an engine, a power supply has to be able to deliver a minimal amperage for a minimal amount of time. Therefore the magnitude of the amperage and the capacity of the battery are important. Typically at least 200 amps are needed for 20 seconds.

The second type of cell 3 is chosen to have a high power density, both in weight and volume, as well as a high ratio of power to cost. The capacity of the second type of cell is chosen so that the power supply can be used on many different occasions without needing to be recharged between each occasion. In this way the power supply of the present invention has sufficient power to start an engine, and sufficient capacity to be used on many different occasions.

Both the first 1 and second 3 types of cells are formed to have electrical characteristics that cause the second cell to recharge the first cell between occasions. In particular the electrical characteristic of nominal voltage must be the same for each type of cell or battery of cells. Also the relationship between cell voltage and cell discharge is such that the voltage of the first cell decreases more quickly with discharge than the voltage of the second cell. After the power supply of the present invention has been used, the first cell will be at a lower voltage than the second cell and the second cell will therefore recharge the first cell.

The first cell in the present invention is preferably a thin metal film cell constructed as described in U.S. Pat. No. 5,047,300 and is incorporated by reference. This cell incorporates porous positive and negative plates having a thickness of less than 0.01 inches, with each plate being formed of a film of metal coated with a layer of electrochemically active paste. The metal films have a thickness of less than 0.005 inches. Also a porous compressible separator is interposed between the positive and negative plates and spirally wound around a central axis into a tubular configuration. The positive plates extend out of one axial end of the tubular configuration and the negative plates extend out of the other end of the tubular configuration. Negative and positive terminal connectors are positioned at the respective anal ends and are in full contact with the entire edges of the respective plates. This gives the first cell or battery of cells a very high peak amperage or cold cranking amperage. For one model of the TMF battery peak amperage is 1600 amps. Correspondingly the discharge rate is very high or fast. The cost for manufacture of these cells is relatively high when compared to traditional or wet cell batteries. The cost of a thin metal film battery is more than ten times the cost of a similar capacity standard or traditional wet cell battery.

Figure 3:
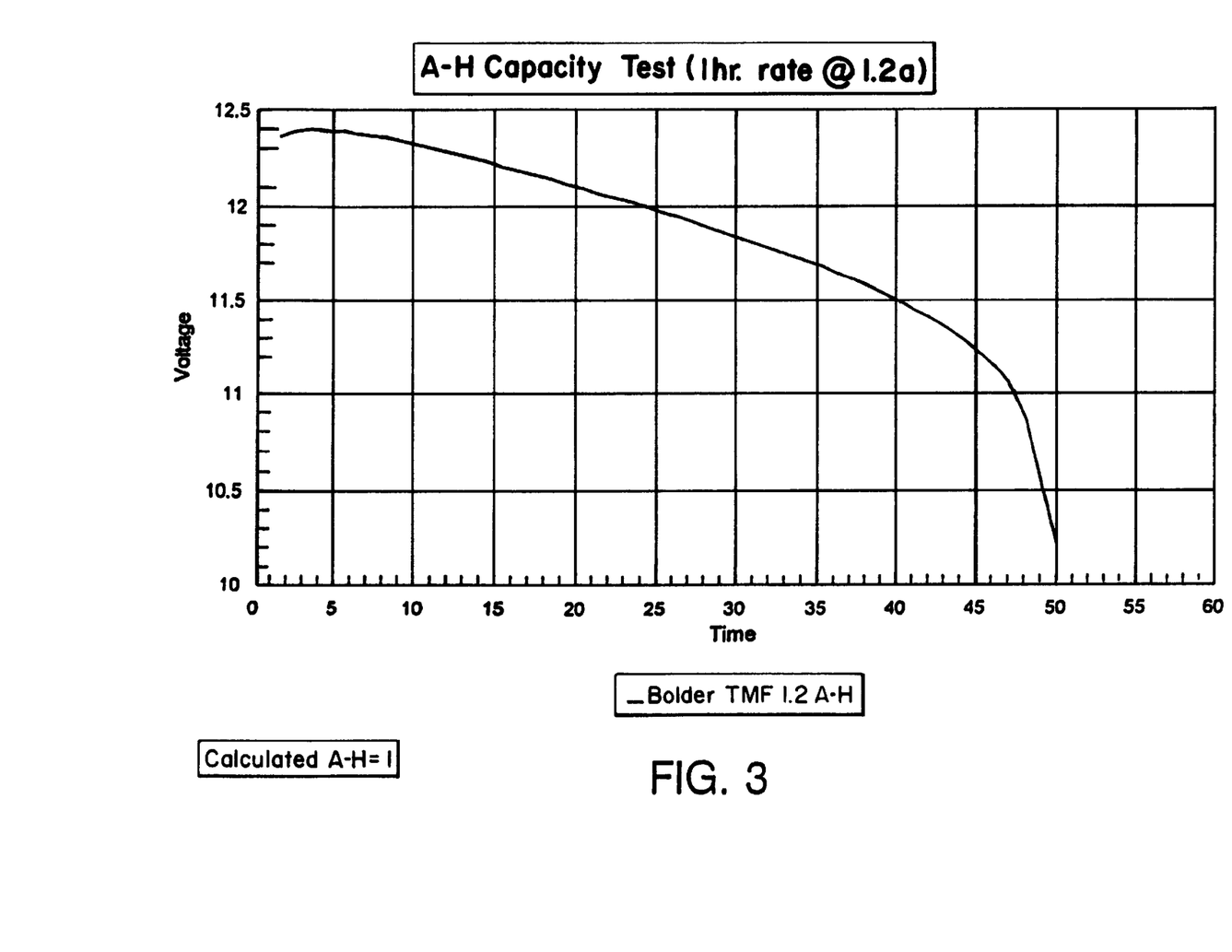
FIG. 3 is a graph showing the capacity of the TMF battery.
Figure 4:
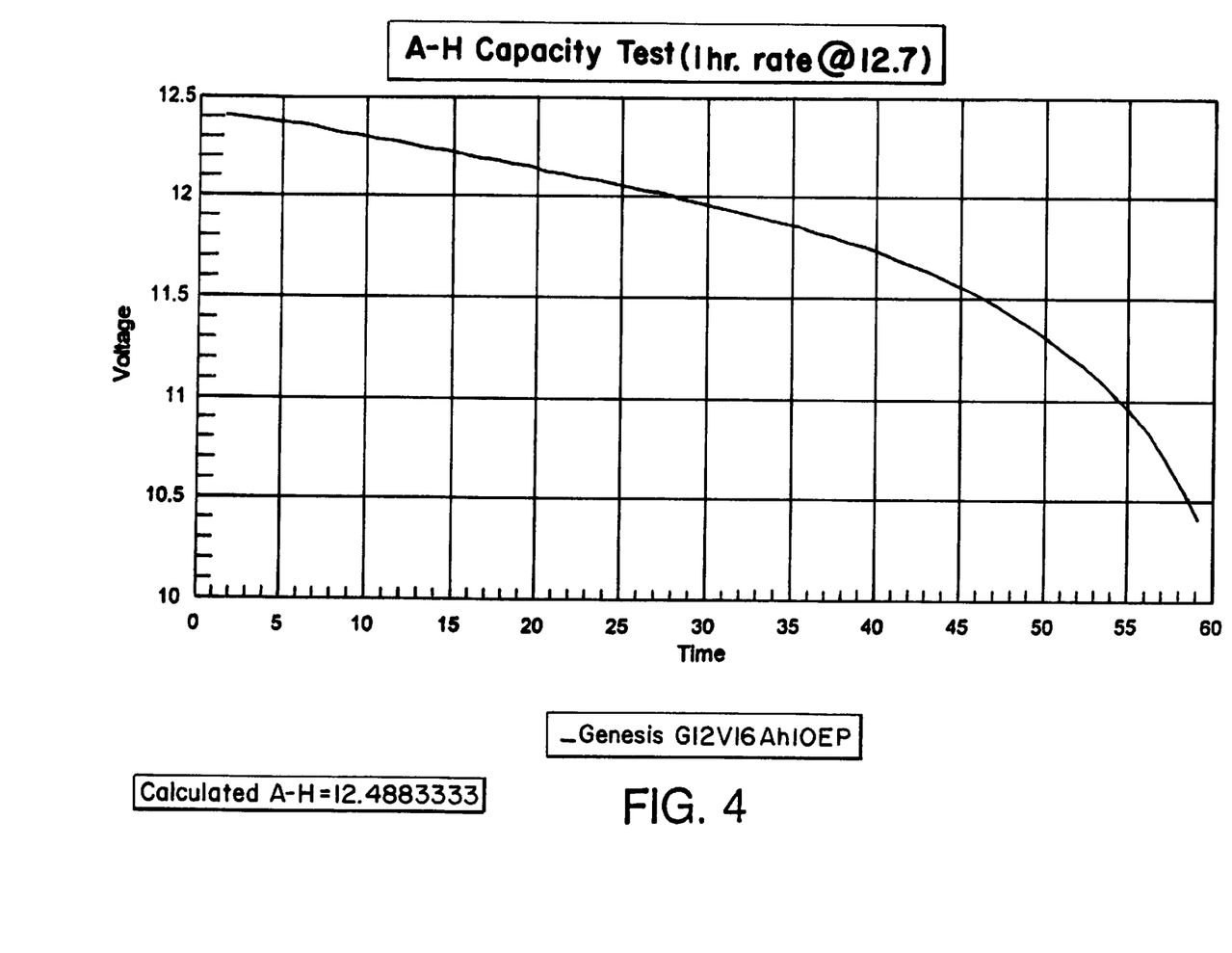
FIG. 4 is a graph showing the capacity of a preferred SLA battery.

Since in the field of the present invention there is often a long time period between occasions where the power supply is not used, all of the required capacity does not need to be stored in this type of cell or battery of cells. The second type of cell or cells is therefore included to store a majority of the capacity. This second type of cell is preferably a lead acid battery wet cell with a plurality of plates formed into a grid pattern and suspended in a sulfuric acid solution. A reactive paste is contained inside the openings in the grid. These traditional or standard wet cell batteries are commonly used in present day vehicles such as automobiles, boats and motorcycles. Their cost is much lower than metal film cells or batteries and they are able to store more capacity in a smaller size, with less weight and at lower cost than the thin metal film cells or batteries. FIGS. 3 and 4 show the relative capacity of the TMF battery and a preferred SLA battery. FIG. 3 shows voltage with respect to time when the TMF battery was discharged at the rate of 1.2 amps per hour, while FIG. 4 shows the ratio of voltage to time in the preferred SLA battery was discharged at the rate of 12.7 amps per hour. The preferred SLA battery therefore has an amp hour capacity which is approximately ten times that of the TMF battery.

In the field of the present invention, the portable power supply may be used on one occasion to start an automobile and then left idle for several hours or days until the next occasion for use. During this time the very densely stored energy in the second type of cell transfers, relatively slowly, into the first type of cell and is made readily available for the next occasion.

Several of the factors that decide whether or not a particular cell will have a high peak voltage or fast discharge rate is the thickness, composition and shape of the plates, along with the connection of the individual plates. In the present invention, the plates of the first cell are thinner than the plates of the second cell, and the plates of the first cell are non-perforated while the plates of the second cell are preferably grid shaped. Also the plates of the first cell preferably are formed of very pure lead, while the plates of the second cell are an alloy for strength. In this way the cost of the second cell is less than the first cell yet sufficient power is available, from both cells, when needed.

In the field of the portable power supplies, there are restrictions as to how large and how heavy the portable power supply can be. If the power supply is too big or heavy, it can no longer be carried by the operator and ceases to be a portable power supply. While it is possible to increase the discharge rate of a standard wet cell battery by adding more cells in parallel, this greatly increases the size and weight. For equal cold cranking amps or peak amperage, a standard or traditional wet cell battery will be more than ten times as heavy and six times as large. By forming a hybrid power supply with two different types of batteries or cells, the present invention is able to provide a power supply with high capacity at low cost, weight and size, while still providing the very large peak amperage and discharge needed for starting an engine.

In the preferred embodiment of the present invention, both the first and second cells are electrochemical cells that rely on the lead acid chemical reaction. Other electrochemical cells are also possible, such as nickel cadmium, lithium, and metal hydride. The construction of the first and second cells is such that the first cell is optimized for peak amperage while the second cell is optimized for energy density and cost. It is also possible to mix and match cells of different electrochemical compositions. It may be possible to have a nickel cadmium battery as the first type of cell and a lead acid battery as the second type of cell, as long as one can be optimized for peak current and the other for cost or density. When using cells of different electrochemical composition, nominal voltage must be taken into consideration. Different electrochemical composition cells have a different nominal voltage. For the present invention to operate properly, the nominal voltages must be substantially identical. If the nominal voltages have a common multiple, the cells of each type can be connected in series to form first and second batteries having substantially identical nominal voltages.

In this specification, reference has been made to a power supply containing a first type of cell and a second type of cell. The present invention can also contain a plurality of cells of the first type and a plurality of cells of the second type. These can be connected in serial or parallel in the known manner in order to produce first and second types of batteries with the desired electrical characteristics. These first and second types of batteries will then be similar to the first and second types of cells previously described.

While specific embodiments of the invention have been shown and described in detail to illustrate the application of the principles of the invention, it will be understood that the invention may be embodied otherwise without departing from such principles.

I claim:

1. A portable power supply, comprising:
   a first cell of a first type, said first cell being rechargeable and having a first peak amperage and having a first discharge rate, the first cell including positive and negative terminals;
   a second cell of a second type, said second cell having a second peak amperage and having a second discharge rate, said second peak amperage being smaller than said first peak amperage, said second discharge rate being slower than said first discharge rate, the second cell including positive and negative terminals; and
   a housing, the first and second cells being positioned in the housing, the housing having positive and negative terminals, the positive terminal of the housing being connected to the positive terminals of the first and second cells, the negative terminal of the housing being connected to the negative terminals of the first and second cells, the housing having a handle capable of lifting and carrying the housing.

2. A portable power supply in accordance with claim 1, wherein:
   said second cell has recharging means for recharging said first cell when said first cell is more discharged than said second cell.

3. A portable power supply in accordance with claim 2, wherein:
   said recharging means includes said first cell having a lower voltage than that of the second cell.

4. A portable power supply in accordance with claim 1, wherein:
   said first and second cells are electrically rechargeable.

5. A portable power supply in accordance with claim 1, wherein:
   said first cell is the first type of sealed lead acid electrochemical cell;
   said second cell is the second type of sealed lead acid electrochemical cell different from said first type of sealed lead acid electrochemical cell.

6. A portable power supply in accordance with claim 1, wherein:
   said first and second cells each have a substantially identical nominal voltage.

7. A portable power supply in accordance with claim 1, wherein:
   said first cell includes positive and negative non-perforated plates;
   said second cell includes positive and negative grid plates.

8. A portable power supply in accordance with claim 7, wherein:
   said plates of said first cell have a thickness less than 0.01 inches;
   said plates of said second cell have a thickness greater than 0.05 inches.

9. A portable power supply in accordance with claim 1, wherein:
   said first and second cells are electrochemical cells having a substantially identical nominal voltage and connected in parallel to form a power supply;
   said second cell has recharging means for recharging said first cell when said first cell is more discharged than said second cell, said recharging means includes said first cell having a lower voltage than that of the second cell.

10. A portable power supply in accordance with claim 9, wherein:
    said first cell includes positive and negative non-perforated plates having a thickness less than 0.01 inches;
    said second cell includes positive and negative grid plates having a thickness greater than 0.05 inches.

11. A portable power supply in accordance with claim 1, wherein:
    said second cell has a higher energy density than said first cell.

12. A portable power supply in accordance with claim 1, wherein:
    said second cell has less cost for energy storage than said first cell.

13. A portable power supply in accordance with claim 1:

wherein said first cell includes spirally wound positive and negative plates; and wherein said second cell includes a plurality of substantially parallel plates.

14. A portable power supply, comprising:

a first cell of a first type, said first cell being rechargeable and having a first peak amperage and having a first discharge rate;

a second cell of a second type, said second cell having a second peak amperage and having a second discharge rate, said second peak amperage being smaller than said first peak amperage, said second discharge rate being slower than said first discharge rate;

wherein said first cell is a Thin Metal Film (TMF) lead acid electrochemical cell; and wherein said second cell is a sealed lead acid electrochemical cell.

15. A portable power supply, comprising:

a fist cell of a first type, said first cell being rechargeable and having a first peak amperage and having a first capacity, wherein said first peak amperage is higher than said second peak amperage;

a second cell of a second type, said second cell having a second peak amperage and having a second capacity, said second capacity being larger than said first capacity; and a housing, the housing enclosing the first and second cells, the housing having a handle capable of lifting and carrying the housing.

16. A portable power supply in accordance with claim 15, wherein the first cell is rechargeable by the second cell.

17. A portable power supply in accordance with claim 15, wherein the first cell is a Thin Metal Film (TMF) lead acid electrochemical cell, the second cell is a sealed lead acid electrochemical cell.

18. A portable power supply in accordance with claim 17, wherein the TMF lead acid electrochemical cell includes positive and negative non-perforated plates.

19. A portable power supply in accordance with claim 18, wherein the plates of the TMF lead acid electrochemical cell have a thickness less than 0.01 inches.

20. A portable power supply for a vehicle with a battery, comprising:

a first cell of a first type, the first cell having a first peak amperage and a first discharge rate which are sufficient to boost the battery of the vehicle;

a second cell of a second type which is different from the first type, the first cell being rechargeable by the second cell, the second cell having a second peak amperage and a second discharge rate which are sufficient to recharge the first cell, the second peak amperage being smaller than the first peak amperage, the second discharge rate being slower than the first discharge rate, the second cell having a higher energy density than the first cell, the second cell recharging the first cell when the first cell has a lower voltage than the second cell, the first cell including positive and negative terminals, the second cell including positive and negative terminals, the first and second cells each having a substantially identical nominal voltage and connected in parallel to form the power supply;

a housing, the first and second cells being positioned in the housing having positive and negative terminals, the positive and negative terminals of the housing being configured and arranged for connection to the battery of the vehicle, the positive terminal of the housing being connected to the positive terminals of the first and second cells, the negative terminal of the housing being connected to the negative terminals of the first and second cells, the housing having a handle capable of lifting and carrying the housing.

21. A portable power supply, comprising:

a first cell of a first type, said first cell being rechargeable and having a first peak amperage and having a first capacity;

a second cell of a second type, said second cell having a second peak amperage and having a second capacity, said second capacity being larger than said first capacity, wherein said first cell is a Thin Metal Film (TMF) lead acid electrochemical cell, and said second cell is a sealed lead acid electrochemical cell; and a housing, the housing enclosing the first and second cells, the housing having a handle capable of lifting and carrying the housing.

22. A portable power supply in accordance with claim 21, wherein the TMF lead acid electrochemical cell includes positive and negative non-perforated plates.

23. A portable power supply in accordance with claim 22, wherein the plates of the TMF lead acid electrochemical cell have a thickness less than 0.01 inches.

* * * * *

US005993983B1

(12) REEXAMINATION CERTIFICATE (4446th)

United States Patent
Rozon (10) Number: US 5,993,983 C1
(45) Certificate Issued: Sep. 18, 2001

(54) PORTABLE POWER SUPPLY USING HYBRID BATTERY TECHNOLOGY

(75) Inventor: Paul Rozon, Saint-Luc (CA)

(73) Assignee: Century Mfg. Co., St. Paul, MN (US)

Reexamination Request:
No. 90/005,750, Jun. 15, 2000

Reexamination Certificate for:
Patent No.: 5,993,983
Issued: Nov. 30, 1999
Appl. No.: 08/818,119
Filed: Mar. 14, 1997

(51) Int. Cl.⁷ .......................... H01M 12/00; H01M 6/46; H01M 2/10; H01M 10/44
(52) U.S. Cl. ............................ 429/9; 429/156; 429/187; 429/204
(58) Field of Search .................. D14/138; 429/9, 429/204, 178, 156, 187, 99, 158, 159, 160

(56) References Cited

U.S. PATENT DOCUMENTS

| | | | |
|---|---|---|---|
| D. 311,916 | * 11/1990 | Tomimatu et al. | D14/148 |
| D. 383,130 | * 9/1997 | Waldner | D14/138 |
| 4,156,171 | 5/1979 | Kofink . | |
| 5,368,961 | 11/1994 | Juergens . | |
| 5,571,634 | 11/1996 | Gozdz et al. . | |
| 5,591,212 | 1/1997 | Keimel . | |
| 5,670,274 | * 9/1997 | Forrer . | |
| 5,767,658 | * 6/1998 | Hayes . | |
| 5,808,448 | 9/1998 | Naito . | |

FOREIGN PATENT DOCUMENTS 6-078465    4/1991  (JP) .

OTHER PUBLICATIONS

Article from Machine Design entitled "Hybrid Battery Systems Take Charge," 2 cover pages and pp. 123–127, dated Nov. 9, 1989.
Article from Journal of Power Sources entitled "Effects of fast charging on hybrid lead/acid battery temperature," pp. 163–175, dated 1994. (No month).
Article from Electrical Engineeering in Japan, vol. 100, No. 3, pp. 68–77, dated 1980. (No month).
Article from Powertechnics Magazine entitled "Hybrid battery systems," pp. 24–26, dated Mar. 1990.

* cited by examiner

Primary Examiner—John S. Maples (57) ABSTRACT

A personal portable power supply containing first and second different types of cells or batteries of cells. The capacity and discharge rate of the power supply is such that it is capable of starting automobile engines on several different occasions without needing to be electrically recharged. The capacity is also such that it can power personal devices for relatively long periods of time. The first cell or battery of cells is chosen to have a high discharge rate and high peak amperage or cold cranking amperage. The second type of cell or battery of cells is chosen to have a high energy density and a low cost. The electrical characteristics of each cell or battery of cells is chosen so that the second type of cell is able to recharge the first type of cell during periods of non-use.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-14, 20 and 21-23 is confirmed.

Claim 17 is cancelled.

Claims 15 and 18 are determined to be patentable as amended.

Claims 16 and 19, dependent on an amended claim, are determined to be patentable.

15. A portable power supply, comprising:

a first cell of a first type, said first cell being rechargeable and having a first peak amperage and having a first capacity[, wherein said first peak amperage is higher than said second peak amperage];

a second cell of a second type, said second cell having a second peak amperage and having a second capacity, said second capacity being larger than said first capacity, *wherein said first peak amperage is higher than said second peak amperage*; [and]

a housing, the housing enclosing the first and second cells, the housing having a handle capable of lifting and carrying the housing*; and*

*wherein the first cell is a Thin Metal Film (TMF) lead acid electrochemical cell, the second cell is a sealed lead acid electrochemical cell.*

18. A portable power supply in accordance with claim [17] *15*, wherein the TMF lead acid electrochemical cell includes positive and negative non-perforated plates.

\* \* \* \* \*